US 12,294,965 B2

(12) United States Patent
Niu et al.

(10) Patent No.: US 12,294,965 B2
(45) Date of Patent: May 6, 2025

(54) TIMING CONFIGURATION IN WIRELESS COMMUNICATION SYSTEMS (71) Applicant: ZTE Corporation, Guangdong (CN)

(72) Inventors: Li Niu, Guangdong (CN); Ting Lu, Guangdong (CN); Xiubin Sha, Guangdong (CN); Bo Dai, Guangdong (CN)

(73) Assignee: ZTE Corporation, Shenzhen (CN)

( * ) Notice: Subject to any disclaimer, the term of this patent is extended or adjusted under 35 U.S.C. 154(b) by 314 days.

(21) Appl. No.: 17/848,830

(22) Filed: Jun. 24, 2022

(65) Prior Publication Data

US 2022/0322266 A1 Oct. 6, 2022

Related U.S. Application Data (63) Continuation of application No. PCT/CN2020/107904, filed on Aug. 7, 2020.

(51) Int. Cl.
H04W 72/23 (2023.01)
H04W 56/00 (2009.01)

(52) U.S. Cl.
CPC ....... H04W 56/0045 (2013.01); H04W 72/23 (2023.01)

(58) Field of Classification Search
CPC .......................... H04W 56/0045; H04W 72/23
See application file for complete search history.

(56) References Cited

U.S. PATENT DOCUMENTS

| | | |
|---|---|---|
| 2019/0029064 A1 | 1/2019 | Syue |
| 2019/0053184 A1 | 2/2019 | Park et al. |
| 2020/0137760 A1 | 4/2020 | Shih et al. |
| 2020/0137761 A1 | 4/2020 | Shih et al. |
| 2020/0196264 A1 | 6/2020 | Shih et al. |
| 2021/0259040 A1* | 8/2021 | Babaei ................. H04W 72/23 |
| 2022/0007391 A1* | 1/2022 | Höglund ........... H04W 72/1268 |

FOREIGN PATENT DOCUMENTS

| | | |
|---|---|---|
| CN | 111132345 A | 5/2020 |
| KR | 10-2020-0037375 A | 4/2020 |
| WO | 2019/032997 A1 | 2/2019 |

OTHER PUBLICATIONS

Huawei, "Report of email discussion [106#59][R16 NB-IoT/eMTC] D-PUR Procedural steps," 3GPP TSG-RAN WG2 Meeting#107, R2-1910173, Prague, Czech Republic, Aug. 26-30, 2019 (25 pages).

(Continued)

Primary Examiner — Samina F Choudhry
(74) Attorney, Agent, or Firm — Perkins Coie LLP (57) ABSTRACT Methods, systems, and devices for timing configuration in mobile communication technology are described. An example method of wireless communication includes receiving, by a wireless device from a network node, a message comprising a medium access control (MAC) layer timing control, and selectively starting, based on a rule and subsequent to the receiving, a time alignment timer, wherein the rule specifies the time alignment timer is not started when the MAC layer is performing a resource configuration transmission and the time alignment timer is started when the MAC layer is not performing the resource configuration transmission.

22 Claims, 8 Drawing Sheets (56) References Cited

OTHER PUBLICATIONS

Office Action for Chinese Patent Application No. 202310831879.3, mailed Mar. 7, 2024 (12 pages).
3GPP TSGRAN E-UTRA, "Medium Access Control (MAC) protocol specification [Release 16]," 3GPP TS 36.321 V16.1.0, 141 pages, Jul. 31, 2020.
Huawei et al., "Discussion on Doppler compensation, timing advance and RACH for NTN," 3GPP TSG RAN WG1 Meeting #98bis, Chongqing, China, R1-1910064, 8 pages, Oct. 14-20, 2019.
Institute for Information Industry III, "Discussion on transmission in preconfigured UL resources," 3GPP TSG RAN WG1 Meeting #94bis, Chengdu, China, R1-1811555, 3 pages, Oct. 8-12, 2018.
Ericsson, "Handling of Timing Advance during RA," TSG-RAN WG2 Meeting #62, Kansas City, USA, R2-082736, 4 pages, May 5-9, 2008.
International Search Report and Written Opinion for International Application No. PCT/CN2020/107904, mailed on Apr. 29, 2021 (9 pages).
Samsung, "Chang Request: Priority ALL—Update of section 7 Layer 2 to comply with RAN5 PRD13," 3GPP TSG-RAN WG5 Meeting #46, f, R5-101056, San Francisco, CA, 204 pages, Feb. 2010.
Extended European Search Report for European Patent Application No. 20948549.9, mailed Nov. 8, 2022 (11 pages).
Office Action for Chinese Patent Application No. 202310831879.3, mailed Jun. 7, 2024 (12 pages).
Office Action for Korean Patent Application No. 10-2022-7022315, mailed Sep. 19, 2024, with English summary (4 pages).
Notification to Complete Formalities of Registration for Chinese Patent Application No. 202310831879.3, mailed Aug. 27, 2024 (4 pages).
Nokia et al., "Remaining Issues for D-PUR Signaling Procedure," 3GPP TSG RAN WG2 Meeting #107bis, R2-1912411, Chongqing, China, Oct. 14-18, 2019 (4 pages).
Communication Pursuant to Article 94(3) EPC for European Patent Application No. 20948549.9, mailed Oct. 9, 2024 (13 pages).
Written Opinion for co-pending SG application No. 11202250761X, mail date: Nov. 18, 2024, 8 pages.
Communication pursuant to Article 94(3) EPC for European Patent Application No. 20948549.9, mailed Feb. 24, 2025 (8 pages).

\* cited by examiner

652 — Transmitting, by a network node to a plurality of wireless devices, a message comprising an increment for a timing adjustment, such that the increment is identical for each of the plurality of wireless devices being served by the network node

TIMING CONFIGURATION IN WIRELESS COMMUNICATION SYSTEMS

CROSS REFERENCE TO RELATED APPLICATIONS

This patent document is a continuation of and claims benefit of priority to International Patent Application No. PCT/CN2020/107904, filed on Aug. 7, 2020. The entire content of the before-mentioned patent application is incorporated by reference as part of the disclosure of this application.

TECHNICAL FIELD

This document is directed generally to wireless communications.

BACKGROUND

Wireless communication technologies are moving the world toward an increasingly connected and networked society. The rapid growth of wireless communications and advances in technology has led to greater demand for capacity and connectivity. Other aspects, such as energy consumption, device cost, spectral efficiency, and latency are also important to meeting the needs of various communication scenarios. In comparison with the existing wireless networks, next generation systems and wireless communication techniques will provide support for an increased number of users and devices, as well as support for higher data rates.

SUMMARY

This document relates to methods, systems, and devices for timing configuration in mobile communication technology, including 5th Generation (5G) and New Radio (NR) communication systems.

In one exemplary aspect, a wireless communication method is disclosed. The method includes operating a wireless device to receive, by the wireless device from a network node, a message, and configuring, based on the message, the wireless device to establish a connection with the network node.

In another exemplary aspect, a wireless communication method is disclosed. The method includes transmitting, by a network node to a wireless device, a message, wherein the message configures the wireless device to establish a connection with the network node.

In yet another exemplary aspect, a wireless communication method is disclosed. The method includes receiving, by a wireless device from a network node, a message comprising a medium access control (MAC) layer timing control, and selectively starting, based on a rule and subsequent to the receiving, a time alignment timer, wherein the rule specifies the time alignment timer is not started when the MAC layer is performing a resource configuration transmission and the time alignment timer is started when the MAC layer is not performing the resource configuration transmission.

In yet another exemplary aspect, a wireless communication method is disclosed. The method includes receiving, by a wireless device from a network node, a message comprising an increment for a timing adjustment that is applicable to all wireless devices in the non-terrestrial network, and adjusting a local timing based on the increment for the timing adjustment.

In yet another exemplary aspect, a wireless communication method is disclosed. The method includes transmitting, by a network node to a plurality of wireless devices, a message comprising an increment for a timing adjustment, such that the increment is identical for each of the plurality of wireless devices being served by the network node.

In yet another exemplary aspect, the above-described methods are embodied in the form of processor-executable code and stored in a computer-readable program medium.

In yet another exemplary embodiment, a device that is configured or operable to perform the above-described methods is disclosed.

The above and other aspects and their implementations are described in greater detail in the drawings, the descriptions, and the claims.

DETAILED DESCRIPTION

With the rapid development of smart cities and big data, all devices, vehicles and infrastructure components are being connected via wireless communication. Many people and enterprises predict that the number of Internet of Things (IoT) connections in the future will number in the hundreds of billions. In order to meet the different business needs of an IoT network, and based on the characteristics of a mobile communication network, the 3GPP standard and other organizations have started researching Narrowband Internet of Things (NB-IoT) and enhanced Machine Type Communication (eMTC) to adapt to the developing needs. Since the first NB-IoT and eMTC standard were issued in 2016, the NB-IoT and eMTC industry have developed rapidly. In just three years, NB-IoT and eMTC have been widely used in more than 50 countries. NB-IoT and eMTC technology will become the mainstream technologies of the 5G IoT network.

NB-IoT and eMTC are a Wireless Area Network (WAN) technology with low power consumption. They can be used for weather monitoring, power grid monitoring, meter reading data transmission, video surveillance, etc. In order to meet the needs of wide coverage, these networks needs to have four key characteristics: low cost, strong coverage, low power consumption and support for a large number of connections. NB-IoT and eMTC can cover a very large area, even in remote areas. However, a large number of terminals of NB-IoT and eMTC need to be spread throughout the area. Thus, the cost of network layout is typically prohibitive. For example, the weather monitoring terminals are arranged over a range of thousands of kilometers in sparsely populated areas. If the power consumption of terminals is not reduced in practical applications, e.g., reading a water meter, it may be difficult to replace the battery manually. Thus, there is a need to reduce power consumption in existing NB-IoT and eMTC terminals.

In RRC connected mode, the terminals have to monitor the PDCCH and keep continuously synchronized with the network node, which consumes power. In contrast, in RRC idle mode, the terminals remain silent most of the time, which saves power. Thus, in order to save power, the terminal can remain in the RRC idle mode as much as possible. When data arrives for terminals in RRC idle mode, the terminals can stay in the RRC idle mode to transmit the data instead of entering into RRC connected mode.

This approach requires grant and timing adjustments for uplink transmissions. Due to the propagation delay, the timing of uplink transmission has to be advanced to align with the timing of the node. In the RRC connected mode, the node can send the timing advance command indicating the timing offset between uplink and downlink radio frames at the UE to help the terminals to align the uplink transmission. In some embodiments, a time alignment timer is used to guarantee the validity of the timing offset value. If this timer expires, the timing offset value is invalid, and the terminals lose the uplink synchronization.

However, if the terminals have an intention to send UL data or an RRC message in RRC idle mode, due to the absence of grant and timing adjustments for uplink transmissions, the terminals have to typically trigger a Random Access Channel (RACH) procedure to obtain that information. However, the RACH procedure requires additional operations and increased power consumption. Thus, there is a need to simplify these operations and decrease the delay of UL transmission by skipping the RACH procedure.

Furthermore, the MAC in a UE cannot start the time alignment timer due to the lack of a Random Access Response (RAR) and a Timing Advance Command MAC Control Element (CE) when entering into RRC connected mode, and is started upon reception of the TAC MAC CE in the idle mode. The node cannot link the Preconfigured Uplink Resource (PUR) configuration and the UE, and release the corresponding the PUR resource.

Embodiments of the disclosed technology address the aforementioned issues to ensure that the MAC can start the time alignment timer when entering into RRC connected mode and not started in idle mode, and the node is able to link the PUR configuration and the UE.

Figure 1:
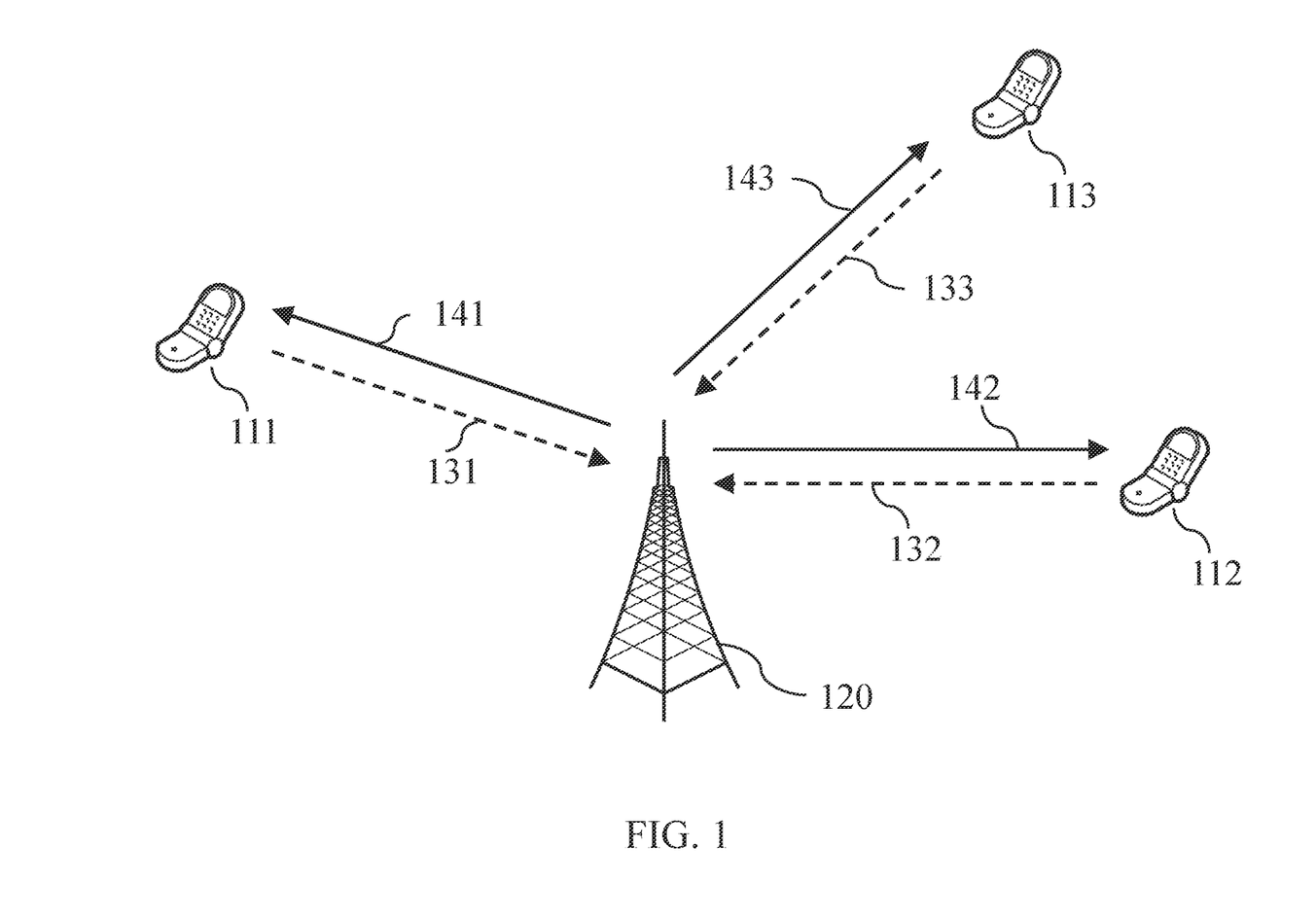
FIG. 1 shows an example of a network node (e.g., base station or gNodeB) and a wireless device (e.g., user equipment (UE)) in wireless communication.

FIG. 1 shows an example of a wireless communication system (e.g., an LTE, 5G or New Radio (NR) cellular network) that includes a B S 120 and one or more user equipment (UE) 111, 112 and 113. In some embodiments, the downlink transmissions (141, 142, 143) include a Radio Resource Control (RRC) message multiplexed with a Timing Advance Command (TAC) Medium Access Control (MAC) Control Element (CE). The UE may be, for example, a smartphone, a tablet, a mobile computer, a machine to machine (M2M) device, a terminal, a mobile device, an Internet of Things (IoT) device, and so on.

The present document uses section headings and subheadings for facilitating easy understanding and not for limiting the scope of the disclosed techniques and embodiments to certain sections. Accordingly, embodiments disclosed in different sections can be used with each other. Furthermore, the present document uses examples from the 3GPP New Radio (NR) network architecture and 5G protocol only to facilitate understanding and the disclosed techniques and embodiments may be practiced in other wireless systems that use different communication protocols than the 3GPP protocols.

Example Embodiment 1

In some embodiments, a preconfigured uplink resource (PUR) is supported in the idle mode. The node can configure a dedicated uplink grant (e.g., frequency-domain and time-domain resources) to the terminals via an RRC release message when the node indicates that the terminals should enter into RRC idle mode. In RRC idle mode, the terminals can use those resource to deliver the UL data or RRC message when the UL data arrives without a Random Access Channel (RACH). However, a valid timing adjustment for uplink transmission is necessary. As a result, a PUR time alignment timer is used to guarantee the validity of the adjustment value. If this timer expires, the timing offset value is invalid, and the PUR resource also is invalid.

In an example, and upon reception of the RRC release message, the UE can enter into RRC idle mode and reset the MAC entity. If a reset of the MAC entity is requested by upper layers, the MAC entity shall stop the time alignment timers, assume all time alignment timers have expired, and perform the corresponding actions, such as storing or maintaining the timing offset value. The timing offset value (e.g., N_TA) is used for advancing or delaying the uplink transmission timing, and can be generated by the timing advance command indication in RAR, the Timing Advance Command MAC control element, or the timing adjustment indication in the downlink control information (DCI).

In another example, and upon reception of an RRC message such as RRC connection setup message, RRC connection re-establishment message, or RRC connection reconfiguration message, the UE enters RRC connected mode or maintains RRC connection with the node. If the UE falls back to RRC connection establishment using PUR, for example, the UE transmits the RRC connect request, RRC connection resume request, RRC Early Data Request message, RRC connection re-establishment request, or RRC connection reconfiguration complete message and other uplink data using PUR and receives the RRC connect setup message, RRC connection re-establishment message, or other DL grant as a response message. Because the PUR transmission lacks the RACH procedure, the UE cannot receive the RAR that includes the timing advance command.

In some embodiments, the condition to start the time alignment timer can either be receiving a Timing Advance Command MAC control element or receiving a Timing Advance Command in a Random Access Response message. As a result, the UE cannot start the time alignment timer due to the lack of RAR and Timing Advance Command MAC control element upon reception of the response message. Since the UE cannot start the time alignment timer when entering into RRC connected mode, it cannot send HARQ feedback for the DL reception or perform any uplink transmission. Hence, the time alignment timer is started for the UE upon reception of the RRC connect setup message.

Figure 2:
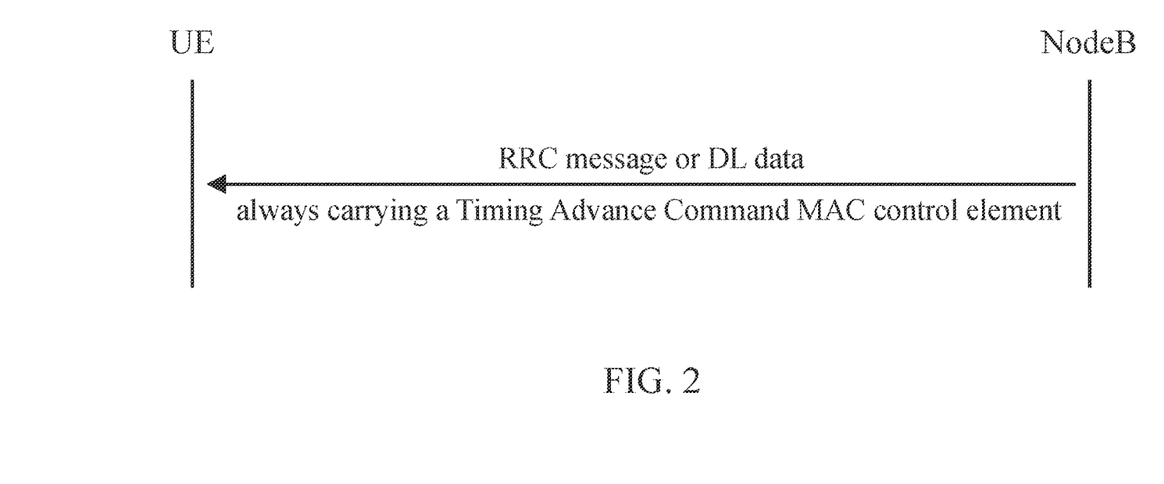
FIG. 2 shows an example of carrying a Timing Advance Control (TAC) MAC Control Element (CE) with an RRC message or downlink (DL) data from a NodeB to a UE.

In some embodiments, a Timing Advance Command MAC control element is carried (or multiplexed) with or included in the RRC message or DL data that provides an indication to the UE to enter into RRC connected mode or setup RRC connection with the node (as shown in FIG. 2).

In an example, when the UE transmits the RRC connect request, the RRC connection resume request, the RRC Early Data Request message, the RRC connection re-establishment request, or RRC connection reconfiguration complete message and other uplink data using PUR to request to setup connection with the node, the node can feedback the RRC connect setup message, the RRC connection re-establishment message, or another DL grant as a response message to indicate to the UE to enter RRC connected mode or set up an RRC connection with the node. Concurrently, a Timing Advance Command MAC control element is multiplexed with the response message. In an example, the node may generate the Timing Advance Command MAC control element and multiplex the response message with the Timing Advance Command MAC control element to produce a MAC PDU. In another example, a MAC PDU may include at least one Timing Advance Command MAC control element and the response message that includes the RRC connect setup message, the RRC connection re-establishment message, or another DL grant. The UE will start the time alignment timer in the MAC layer upon reception of the response message.

Figure 3:
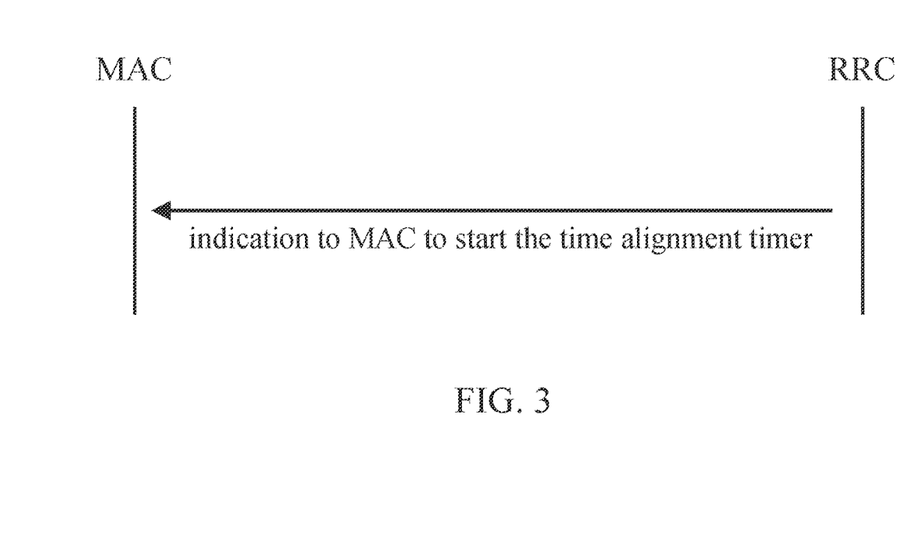
FIG. 3 shows an example of the MAC of a UE starting a time alignment timer upon reception of an indication from the RRC.
Figure 4:
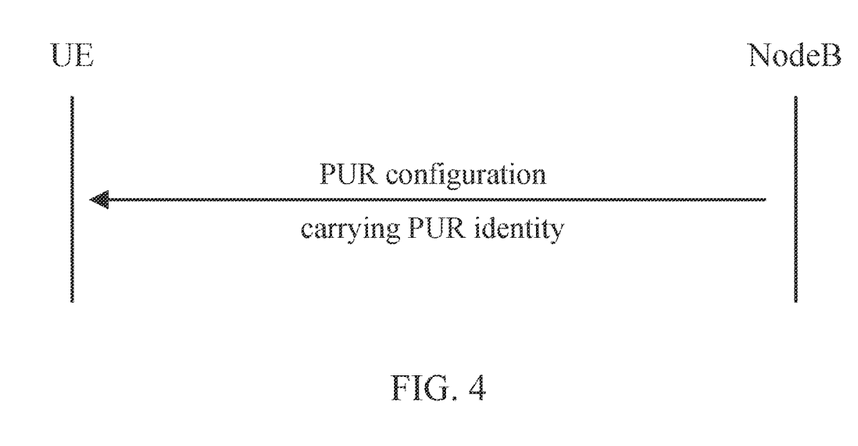
FIG. 4 shows an example of a NodeB transmitting a Preconfigured Uplink Resource (PUR) configuration and a PUR identity to the UE.
Figure 5:
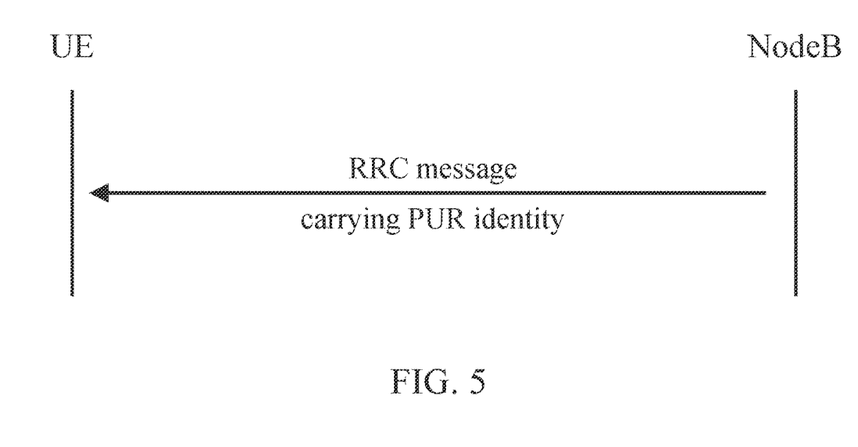
FIG. 5 shows an example of a NodeB transmitting an RRC message and a PUR identity to the UE.

In some embodiments, at the UE, the RRC provides an indication to the MAC to start the time alignment timer upon reception of the RRC connect setup message, the RRC connection re-establishment message, or another DL grant (as shown in FIG. 3). When the RRC receives the RRC connect setup message, RRC connection re-establishment message, or other DL grant, the RRC provides an indication to the MAC to start the time alignment timer. Alternatively, before the RRC transmits the RRC Connection Setup Complete message or RRC connection re-establishment complete message to lower layers for transmission, the RRC provides an indication to the MAC to start the time alignment timer.

In some embodiments, and in idle mode, the UE starts the time alignment timer when the PUR time alignment timer has started and the length of the time alignment timer is configured to be the same as that of the PUR time alignment timer. In an example, when the PUR time alignment timer is started or restarted, in the case that the UE receives a Timing Advance Command MAC control element or a PUR configuration, the UE also starts the time alignment timer. When the PUR time alignment timer expires, time alignment timer expires.

In some embodiments, and in idle mode, the UE starts the time alignment timer upon the transmission using PUR. In an example, when RRC provides the MAC of an indication of the PUR configuration, the PUR-RNTI, the PUR respond window timer is started, and the UE also starts the time alignment timer. Until the PUR transmission is completed, for example, the MAC deletes the PUR configuration or the PUR-RNTI, and the PUR respond window timer stops or expires, and the time alignment timer stops or expires.

In some embodiments, the MAC entity does not perform any uplink transmissions on a Serving Cell, other than the Random Access Preamble transmission, when there is no valid timing offset value. In other embodiments, the MAC entity does not perform any uplink transmission on a Serving Cell, other than the Random Access Preamble transmission, when the time alignment timer associated with the TAG to which this Serving Cell belongs is not running and there is no valid timing offset value. When the time alignment timer and PUR time alignment timer expire, the timing offset value is invalid. When the MAC receives the timing advance command indication in RAR or Timing Advance Command MAC control element, the timing offset value is valid and updated. If the MAC stores or maintains the timing offset value during the PUR transmission (e.g., the MAC has a PUR-RNTI or the PUR respond window timer is running), the timing offset value is valid.

In some embodiments, the MAC entity does not perform any uplink transmission on a Serving Cell, other than the Random Access Preamble transmission, when the time alignment timer associated with the TAG to which this Serving Cell belongs is not running (or inactive). In an example, the time alignment timer may be not running during a PUR transmission. In this way, the UE cannot perform the PUR transmission, and thus, the uplink transmission excludes the PUR transmission. In another example, the MAC entity does not perform any uplink transmission on a Serving Cell, other than the Random Access Preamble transmission, when the time alignment timer associated with the TAG to which this Serving Cell belongs is not running, but the MAC layer still has a PUR-RNTI. In another example, the MAC entity does not perform any uplink transmission on a Serving Cell, other than the Random Access Preamble transmission and the PUR transmission, when the time alignment timer associated with the TAG to which this Serving Cell belongs is not running.

Example Embodiment 2

In some embodiments, and upon reception of the RRC release message, UE shall enter into RRC idle mode and reset the MAC entity. If a reset of the MAC entity is requested by upper layers, the MAC entity shall stop the time alignment timers, consider all time alignment timers as expired, and perform corresponding actions, such as storing or maintaining the adjustment value.

In RRC idle mode, the MAC starts or restarts the time alignment timer when a Timing Advance Command MAC control element is received and if the adjustment value has been stored. Because the MAC entity cannot determine whether the UE is in the RRC connected mode or the idle mode, if the MAC receives a Timing Advance Command MAC control element in idle mode, the time alignment timer is started or restarted.

However, time alignment timer is mainly used in the RRC connected mode. In idle mode and having suspended the RRC connection, the UE has a Cell-Radio Network Temporary Identifier (C-RNTI). In this case, if the time alignment timer is running, UE may receive the uplink grant for this C-RNTI. This may cause confusion.

In order to avoid this, if the MAC layer is performing a PUR transmission, and receives a TAC, UE doesn't start the time alignment timer. In other words, if MAC is not performing a PUR transmission, and receives a TAC, UE starts the time alignment timer. Specially, if MAC has no PUR-RNTI, or the PUR respond window timer is not running, and MAC receives a Timing Advance Command MAC control element or RAR, the time alignment timer is started. If MAC has PUR-RNTI, or the PUR respond window timer is running, the time alignment timer isn't started.

In some embodiments, and for the UE, MAC starts or restarts the time alignment timer if a Timing Advance Command MAC control element indicated by PDCCH addressed to C-RNTI is received. The UE uses C-RNTI in RRC connected mode. Hence, when UE is in RRC connected mode, PDCCH addressed to C-RNTI scheduling a DL data containing a Timing Advance Command MAC control element is received, and then a Timing Advance Command MAC control element is received and the time alignment timer is started or restarted.

In an example, MAC starts or restarts the time alignment timer if a Timing Advance Command MAC control element indicated by PDCCH addressed to PUR-RNTI is received. UE uses PUR-RNTI in RRC idle mode. Hence, when UE is in idle mode, PDCCH addressed to PUR-RNTI scheduling a DL data containing a Timing Advance Command MAC control element is received, and then a Timing Advance Command MAC control element is received and the PUR time alignment timer is started or restarted. In another example, RRC provides an indication to the MAC to delete the time alignment timer when UE enters into idle mode, e.g., when UE receive the RRC release message or some failures happens.

In some embodiments, if the MAC layer intends to delete the time alignment timer, MAC deletes the duration of the timer, but stores or maintains the timing offset value. RRC can provide an indication to the MAC to add the time alignment timer when UE requests a RRC connection with the node, for example, UE initiates transmission of the RRC connect request, RRC connection resume request, RRC early data request message, RRC connection re-establishment request, RRC connection reconfiguration complete message, and other uplink data. Alternatively, before RRC submits the RRC connect request, RRC connection resume request, RRC early data request message, RRC connection re-establishment request, RRC connection reconfiguration complete message and other data to the lower layers for transmission, RRC provides an indication to MAC to add the time alignment timer. Only when MAC adds the time alignment timer, the time alignment timer is valid, and MAC can start or restart the alignment timer when UE receives a Timing Advance Command MAC control element or RAR.

Example Embodiment 3

In a Non-Terrestrial Network (NTN), a satellite moves around the earth while providing connectivity. Although the UE is stationary or slowly moving, the propagation delay between the satellite and the UE changes with the movement of the satellite. In this case, the advance timing for the uplink transmission changes with the movement of the satellite. Existing implementations use significant resources so that the node sends the timing advance command to UE to adjust the advance timing for the uplink transmission frequently.

In some embodiments, the UE can compensate the timing adjustment for the uplink transmission based on the movement of satellite being predictable. In an example, the node can determine the timing adjustment according to the speed and the orbit of the satellite. The node can broadcast in system information or configure in RRC message a positive or a negative increment for the timing adjustment. The node can broadcast in system information or configure in RRC message a interval time when UE applies the value. For UE, every a interval time, UE can add or subtract a value from the previous timing adjustment according to the configuration from the node, and obtain a new value of the timing adjustment for uplink transmission.

In some embodiments, the node can broadcast system information that includes a common positive or a negative increment for timing adjustment. The node can broadcast system information that includes an interval time in which the UE applies the common value. The node can configure an RRC message to include a special positive or a negative increment for timing adjustment. The node can broadcast system information including a time interval in which UE applies the special value. This time interval may be same as the time interval for the common value. The common timing adjustment is applicable for all UEs in the cell, may be the minimum positive or a negative increment for timing adjustment, and determined based on the distance between the movement of satellite and the reference point in cell. The special timing adjustment is applicable for a UE, and may be determined by the location and speed of UE.

In some embodiments, in every time interval for the common value, UE can add or subtract a common value to and from the previous timing adjustment, respectively, based on the configuration from the node, and obtain a new timing adjustment for uplink transmission. In every time interval for the special value, UE can add or subtract a special value to the previous timing adjustment according to the configuration from the node, and obtain a new timing adjustment for uplink transmission.

In some embodiments, the node can broadcast system information that includes or configures in RRC message a positive or a negative increment for timing adjustment. The node can broadcast system information that includes or configures in RRC message a time interval in which the UE applies the value. The node can broadcast system information which includes or configures in RRC message the information. In an example, the information relates to the movement of the satellite, and includes the speed, the height, the angle and so on. In another example, the information is about the reference point, and includes transmission timing and so on.

In some embodiments, for every time interval, UE can add or subtract a value to the previous timing adjustment according to the configuration from the node. In an example, UE can determine an additional timing adjustment by calculating the distance between UE and the satellite, and then UE can add or subtract the additional value to/from the previous timing adjustment, and obtain a new timing adjustment for uplink transmission. The additional timing adjustment is applicable to a UE, it can be determined by the distance between the UE and the satellite, or the transmission delay of the reference point.

Example Embodiment 4

In RRC connected mode, the node can configure the UE with one or more frequencies to measure and some neighboring cell lists. For example, the node can configure one or more intra-frequencies and a neighboring cell list, or one or more inter-frequencies and a neighboring cell list for each inter-frequency. The UE performs the measurements and obtains the measurement results based on the configuration. With a deterioration of signal quality of the serving cell, a RRC reestablishment procedure is triggered. Usually, during the RRC reestablishment procedure, UE perform a initial cell selection procedure or cell selection procedure by leveraging stored information. In the initial cell search procedure, the UE need only search for the strongest cell in the each frequency that UE supported.

By leveraging stored information during the cell selection procedure, the UE can select a target cell based on the stored information of frequencies and the measurement results of previously detected cells. Once the UE has found a suitable cell for which cell selection criteria are fulfilled, the UE shall select that cell and send it the RRC reestablishment request. If no suitable cell is found, the initial cell selection procedure shall be started. However, the load of the candidate cell is not considered in the cell selection procedure during the RRC reestablishment procedure.

In some embodiments, the candidate cell for UE in the cell selection procedure during the RRC reestablishment procedure are ranked. The node can broadcast in the system information or configure in RRC message the priority of the frequency that UE measures. UE can rank the candidate cell based on the measurement results of those cell and the priority of the frequency. For example, the cells in the frequency with higher priority prioritize the cells in the frequency with lower priority.

Example Embodiment 5

In idle mode, UE performs the cell reselection procedure in order to find a more suitable cell. Due to the movement of UE or satellite, UE may move out of the coverage of the serving cell. In this case, UE has to perform the cell reselection procedure, camp on a cell and monitor the paging occasion, otherwise, UE may miss the paging message for UE. But, during the cell reselection procedure, UE has to measure the signal quality of the neighbor cells, and the measurement consumes significant power. If there is no paging message for UE, UE can skip the measurement of the neighbor cell and cell reselection.

In some embodiments, an indication can be provided to the UE as to whether there is a paging message in a forthcoming (or subsequent) time period. In an example, the node can broadcast the frequency, cell identity, cell index of the neighbor cell in the system information. In another example, the node can broadcast a configuration for the paging occasion of the neighbor cells in the system information. The configuration includes the time configuration of paging occasion, for example, the start time, the period, and so on. Alternatively, the configuration includes the time of the next one or more paging occasions; e.g., the time between the paging occasion of the serving cell and the neighbor cell, or the time between the current time of the serving cell and the next one or more paging occasion of the neighbor cell. The node can broadcast whether there is a paging message during this time in the neighbor cell in the system information. In an example, the system information can include a cell index and an indication as to whether there is a paging message. Alternatively, the node can provide an indication in the PDCCH or paging message in the paging occasion as to whether there is a paging message for UE during this time in the neighbor cell, e.g., for a cell index, an indication as to whether there is a paging message for a UE index. If there is no paging during this time in a neighbor cell, UE does not perform the measurement or cell reselection towards this cell until the indicated time passes.

Example Methods and Implementations for the Disclosed Technology

Figure 6A:
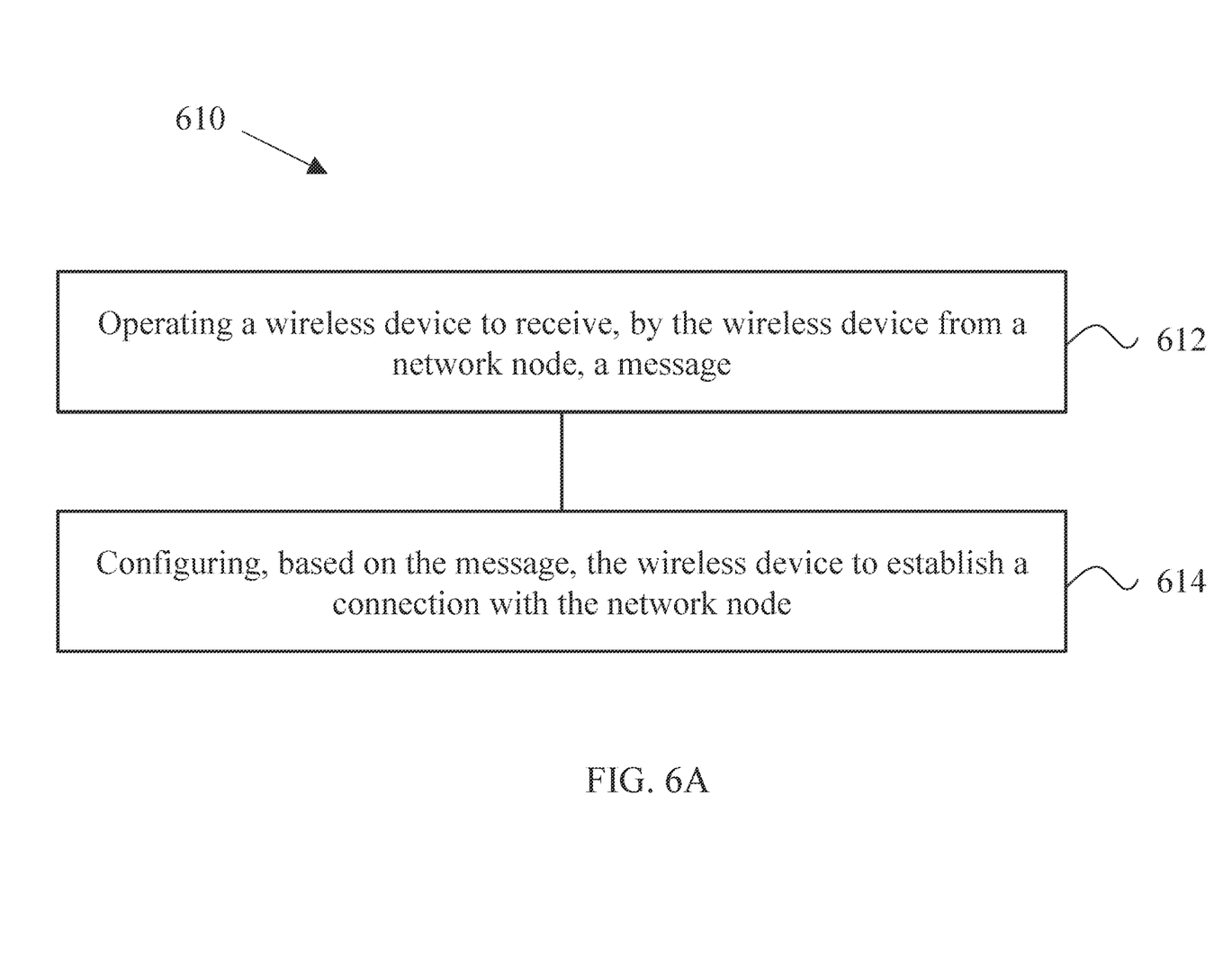
FIGS. 6A-6E show examples of wireless communication methods.

FIG. 6A shows an example of a wireless communication method 610. The method 610 includes, at operation 612, operating a wireless device to receive, by the wireless device from a network node, a message.

The method 610 includes, at operation 614, configuring, based on the message, the wireless device to establish a connection with the network node.

In some embodiments, a medium access control (MAC) layer timing control is multiplexed with the message.

In some embodiments, the method 610 further comprises the operation of starting, based on the MAC layer timing control being multiplexed with the message, a time alignment timer in the MAC layer.

In some embodiments, the MAC layer timing control is a timing advance control (TAC) MAC control element (CE).

In some embodiments, the method 610 further comprises the operation of sending, by a Radio Resource Control (RRC) and based on receiving the message, an indicator to a medium access control (MAC) layer.

In some embodiments, the method 610 further comprises the operation of starting, based on the indicator from the RRC, a time alignment timer in the MAC layer.

Figure 6B:
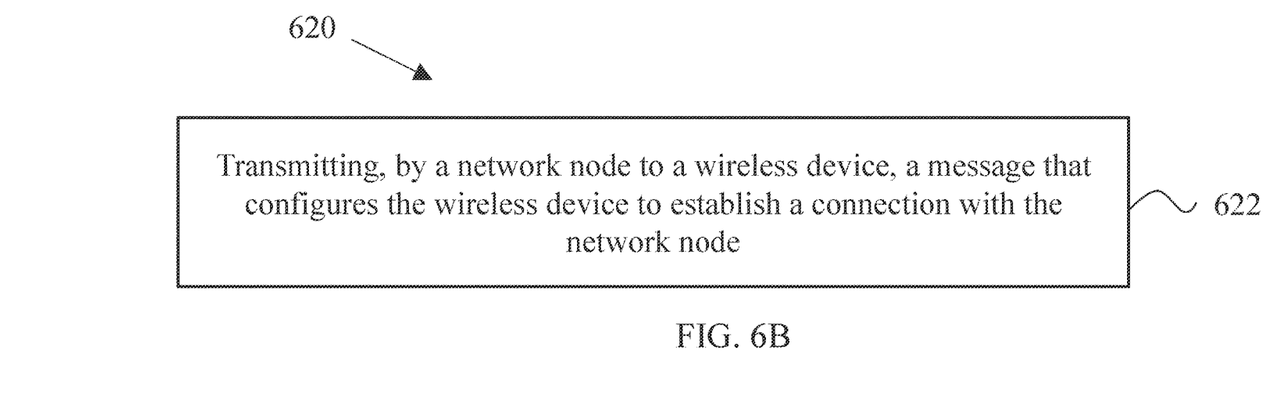

FIG. 6B shows an example of a wireless communication method 620. The method 620 includes, at operation 622, transmitting, by a network node to a wireless device, a message that configures the wireless device to establish a connection with the network node.

In some embodiments, the message is a Radio Resource Control (RRC) message or a downlink (DL) grant, and wherein the connection is an RRC connection or comprises entering an RRC connected mode.

Figure 6C:
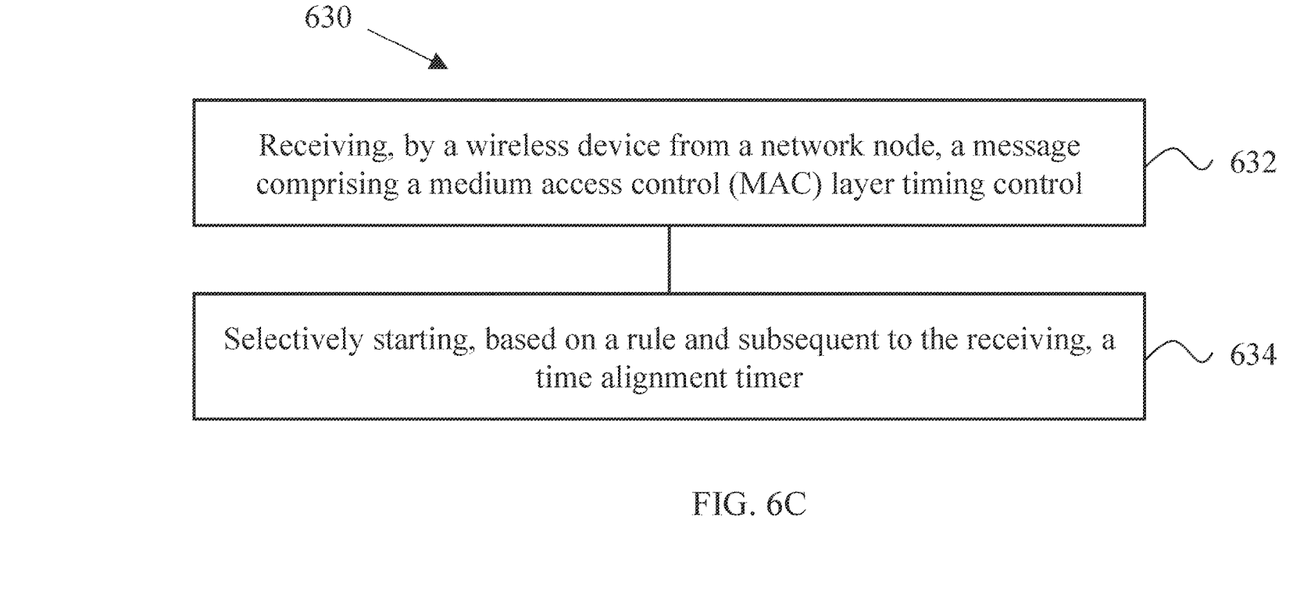

FIG. 6C shows an example of a wireless communication method 630. The method 630 includes, at operation 632, receiving, by a wireless device from a network node, a message comprising a medium access control (MAC) layer timing control.

The method 630 includes, at operation 634, selectively starting, based on a rule and subsequent to the receiving, a time alignment timer. In some embodiments, the rule specifies the time alignment timer is not started when the MAC layer is performing a resource configuration transmission and the time alignment timer is started when the MAC layer is not performing the resource configuration transmission.

In some embodiments, performing the resource configuration transmission corresponds to the MAC layer comprising an identifier associated with the resource configuration transmission.

In some embodiments, performing the resource configuration transmission corresponds to a resource configuration response window timer being inactive.

In some embodiments, performing the resource configuration transmission corresponds to receiving a Timing Advance Command MAC control element indicated by a Physical Downlink Control Channel (PDCCH) addressed to a Cell-Radio Network Temporary Identifier (C-RNTI).

In some embodiments, performing the resource configuration transmission corresponds to the MAC layer deleting the time alignment timer based on an indication from a Radio Resource Control (RRC).

In some embodiments, the message is a Radio Resource Control (RRC) message, a MAC Control Element (CE) or a Physical Downlink Control Channel (PDCCH).

In some embodiments, the MAC layer timing control is a Timing Advance Command (TAC) MAC Control Element (CE), the resource configuration transmission is a preconfigured uplink resource (PUR) transmission, and the identifier associated with the resource configuration transmission is a PUR-Radio Network Temporary Identifier (RNTI), and wherein the resource configuration response window timer is a PUR respond window timer.

Figure 6D:
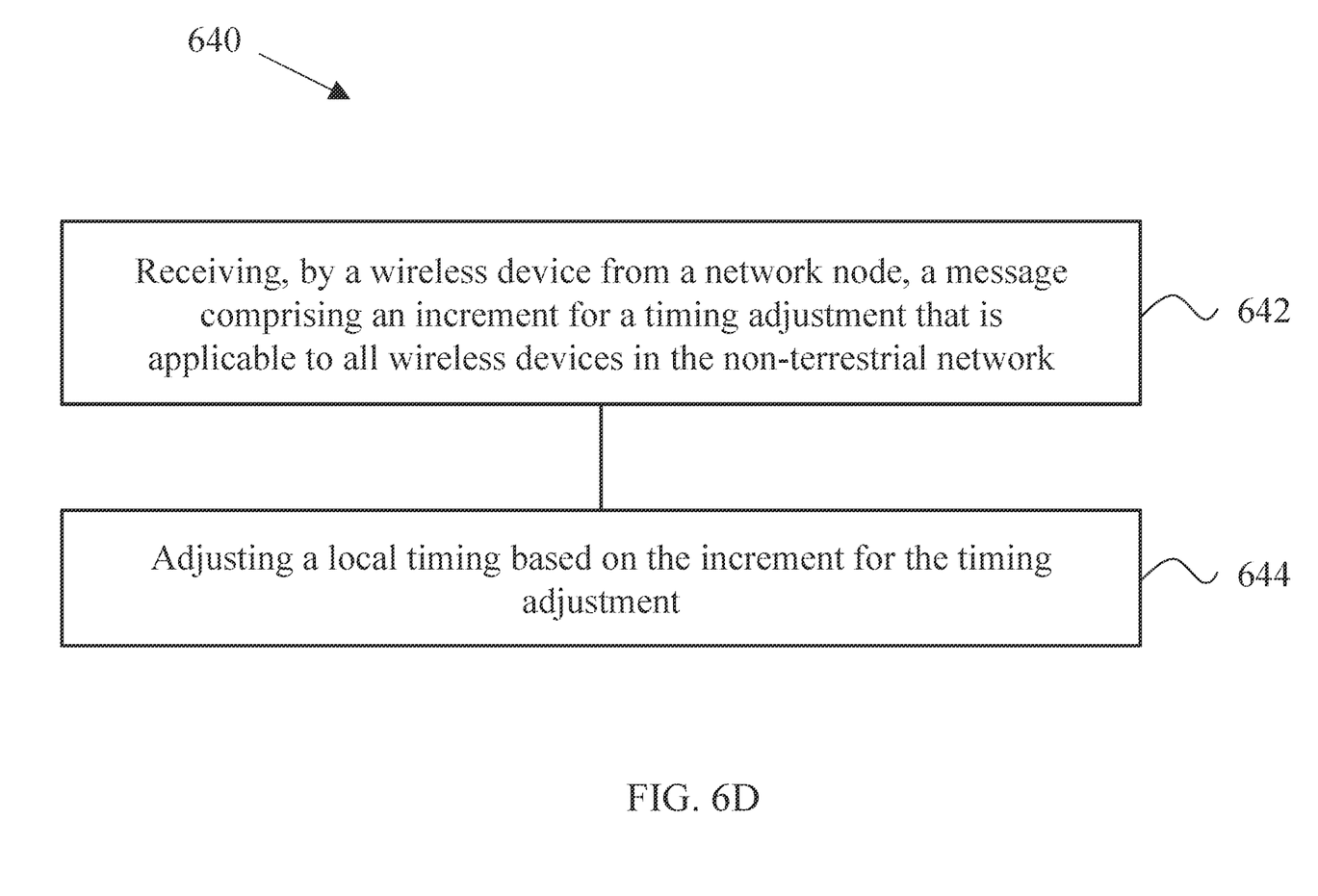

FIG. 6D shows an example of a wireless communication method 640. The method 640 includes, at operation 642, receiving, by a wireless device from a network node, a message comprising an increment for a timing adjustment that is applicable to all wireless devices in the non-terrestrial network.

The method 640 includes, at operation 644, adjusting a local timing based on the increment for the timing adjustment.

In some embodiments, the method 640 further comprises the operation of adding or subtracting the increment for timing adjustment to or from a previous timing adjustment, respectively.

In some embodiments, the method 640 further comprises the operation of receiving information corresponding to a movement of the network node, wherein adjusting the local timing is further based on the information.

Figure 6E:
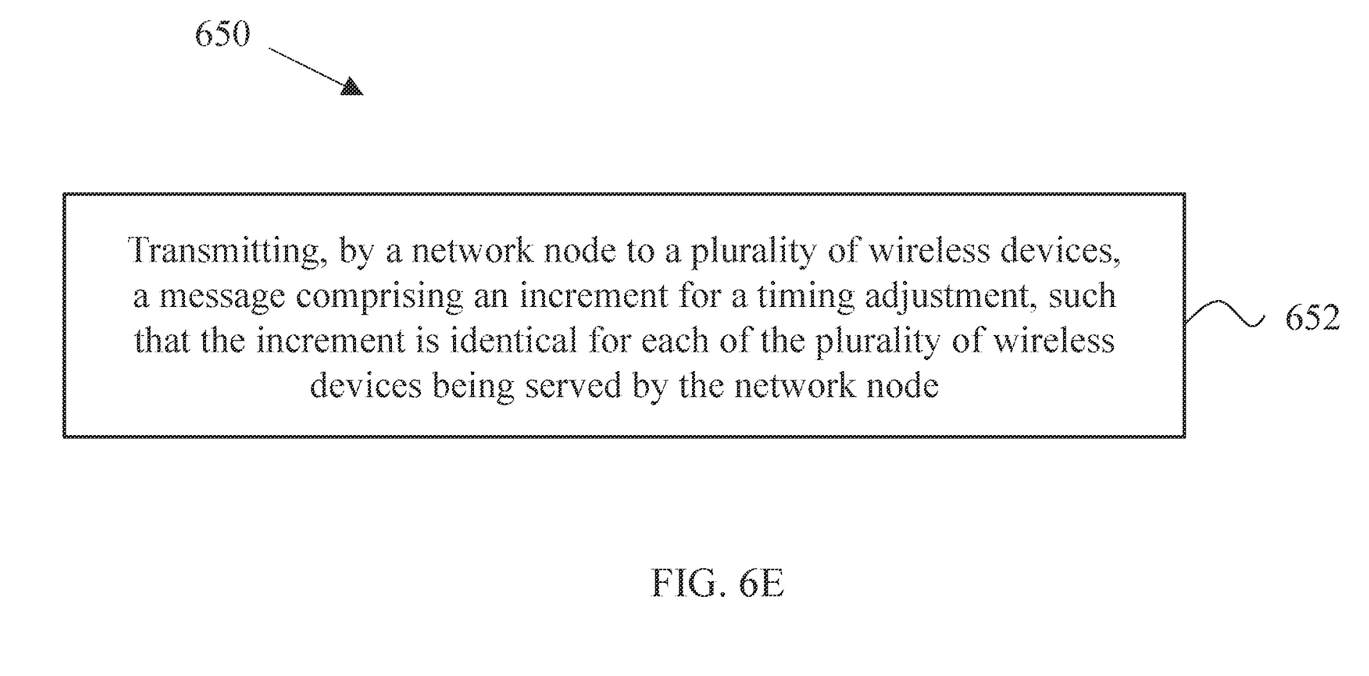

FIG. 6E shows an example of a wireless communication method 650. The method 650 includes, at operation 652, transmitting, by a network node to a plurality of wireless devices, a message comprising an increment for a timing adjustment, such that the increment is identical for each of the plurality of wireless devices being served by the network node.

In some embodiments, the method 650 further comprises the operation of transmitting information corresponding to a movement of the network node, wherein adjusting the local timing is further based on the information.

In some embodiments, the information comprises a speed, a height, and an angle corresponding to a trajectory of the network node.

In some embodiments, adjusting the local timing is further based on a distance between the wireless device and the network node.

In some embodiments, the message is a Radio Resource Control (RRC) message or a system information block (SIB).

In some embodiments, the network node is a node in a non-terrestrial network (NTN).

Figure 7:
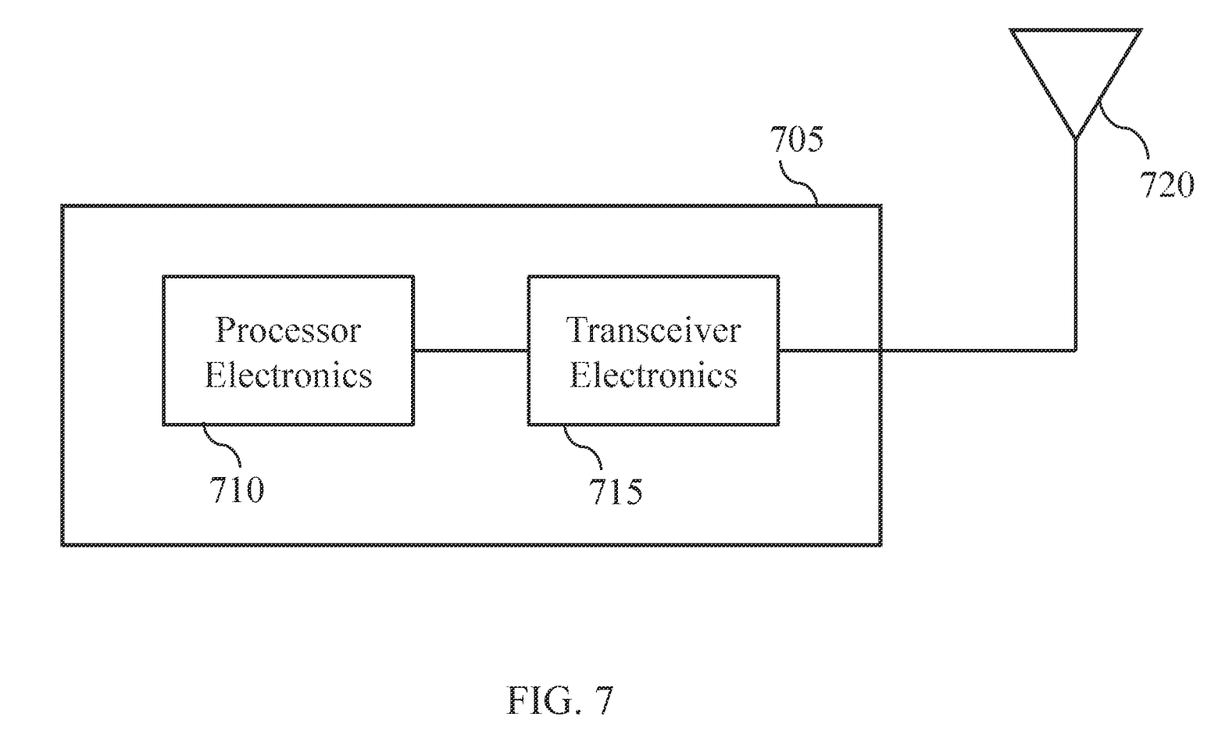
FIG. 7 is a block diagram representation of a portion of an apparatus that can be used to implement methods and techniques described in this document.

FIG. 7 is a block diagram representation of a portion of an apparatus, in accordance with some embodiments of the presently disclosed technology. An apparatus 705, such as a base station or a wireless device (or UE), can include processor electronics 710 such as a microprocessor that implements one or more of the techniques presented in this document. The apparatus 705 can include transceiver electronics 715 to send and/or receive wireless signals over one or more communication interfaces such as antenna(s) 720. The apparatus 705 can include other communication interfaces for transmitting and receiving data. Apparatus 705 can include one or more memories (not explicitly shown) configured to store information such as data and/or instructions. In some implementations, the processor electronics 710 can include at least a portion of the transceiver electronics 715. In some embodiments, at least some of the disclosed techniques, modules or functions are implemented using the apparatus 705.

Some of the embodiments described herein are described in the general context of methods or processes, which may be implemented in one embodiment by a computer program product, embodied in a computer-readable medium, including computer-executable instructions, such as program code, executed by computers in networked environments. A computer-readable medium may include removable and non-removable storage devices including, but not limited to, Read Only Memory (ROM), Random Access Memory (RAM), compact discs (CDs), digital versatile discs (DVD), etc. Therefore, the computer-readable media can include a non-transitory storage media. Generally, program modules may include routines, programs, objects, components, data structures, etc. that perform particular tasks or implement particular abstract data types. Computer- or processor-executable instructions, associated data structures, and program modules represent examples of program code for executing steps of the methods disclosed herein. The particular sequence of such executable instructions or associated data structures represents examples of corresponding acts for implementing the functions described in such steps or processes.

Some of the disclosed embodiments can be implemented as devices or modules using hardware circuits, software, or combinations thereof. For example, a hardware circuit implementation can include discrete analog and/or digital components that are, for example, integrated as part of a printed circuit board. Alternatively, or additionally, the disclosed components or modules can be implemented as an Application Specific Integrated Circuit (ASIC) and/or as a Field Programmable Gate Array (FPGA) device. Some implementations may additionally or alternatively include a digital signal processor (DSP) that is a specialized microprocessor with an architecture optimized for the operational needs of digital signal processing associated with the disclosed functionalities of this application. Similarly, the various components or sub-components within each module may be implemented in software, hardware or firmware. The connectivity between the modules and/or components within the modules may be provided using any one of the connectivity methods and media that is known in the art, including, but not limited to, communications over the Internet, wired, or wireless networks using the appropriate protocols.

While this document contains many specifics, these should not be construed as limitations on the scope of an invention that is claimed or of what may be claimed, but rather as descriptions of features specific to particular embodiments. Certain features that are described in this document in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or a variation of a sub-combination. Similarly, while operations are depicted in the drawings in a particular order, this should not be understood as requiring that such operations be performed in the particular order shown or in sequential order, or that all illustrated operations be performed, to achieve desirable results.

Only a few implementations and examples are described and other implementations, enhancements and variations can be made based on what is described and illustrated in this disclosure.

What is claimed is:

1. A method of wireless communication, comprising:
   transmitting, by a wireless device, a Radio Resource Control (RRC) connection resume request to a network node;
   receiving, by the wireless device from the network node, an RRC connection setup message;
   configuring, based on the RRC connection setup message, the wireless device to establish an RRC connection with the network node using a Preconfigured Uplink Resource (PUR); and
   starting a time alignment timer based on the RRC connection setup message,
   wherein a medium access control (MAC) layer timing control is multiplexed with the RRC connection setup message to generate a MAC protocol data unit (PDU).

2. The method of claim 1, wherein the time alignment timer is started in the MAC layer based on the MAC layer timing control being multiplexed with the RRC connection setup message.

3. The method of claim 2, wherein the MAC layer timing control is a timing advance control (TAC) MAC control element (CE).

4. The method of claim 1, further comprising:
sending, from a Radio Resource Control (RRC) layer and based on receiving the RRC connection setup message, an indicator to a medium access control (MAC) layer, wherein the time alignment timer is started in the MAC layer based on the indicator from the RRC layer.

5. A method of wireless communication, comprising:
receiving, by a network node from a wireless device, a Radio Resource Control (RRC) connection resume request; and
transmitting, by the network node to the wireless device, a RRC connection setup message, wherein the message configures the wireless device to establish a RRC connection with the network node using a Preconfigured Uplink Resource (PUR), and
wherein a time alignment timer is caused to start at the wireless device based on the RRC connection setup message, and
wherein a medium access control (MAC) layer timing control is multiplexed with the RRC connection setup message to generate a MAC protocol data unit (PDU).

6. The method of claim 5, wherein the time alignment timer is started in the MAC layer based on the MAC layer timing control being multiplexed with the RRC connection setup message.

7. The method of claim 6, wherein the MAC layer timing control is a timing advance control (TAC) MAC control element (CE).

8. The method of claim 5, wherein the RRC connection setup message configures an indicator to be sent from a RRC layer to a medium access control (MAC) layer, and wherein the time alignment timer is started in the MAC layer based on the indicator from the RRC layer.

9. A method of wireless communication, comprising:
transmitting, by a wireless device, a Radio Resource Control (RRC) connection resume request to a network node;
receiving, by a wireless device from the network node, an RRC connection setup message comprising a medium access control (MAC) layer timing control;
configuring, based on the RRC connection setup message, the wireless device to establish an RRC connection with the network node using a Preconfigured Uplink Resource (PUR); and
starting, based on a rule, a time alignment timer, wherein the rule specifies that the time alignment timer is not started when a MAC layer is performing a PUR transmission and that the time alignment timer is started when the MAC layer is not performing the PUR transmission;
wherein the MAC layer timing control is multiplexed with the RRC connection setup message to generate a MAC protocol data unit (PDU).

10. The method of claim 9, wherein performing the PUR transmission corresponds to one of the MAC layer comprising an identifier associated with the PUR transmission or a resource configuration response window timer being inactive.

11. The method of claim 9, wherein not performing the PUR transmission corresponds to receiving a Timing Advance Command MAC control element indicated by a Physical Downlink Control Channel (PDCCH) addressed to a Cell-Radio Network Temporary Identifier (C-RNTI).

12. The method of claim 9, wherein performing the PUR transmission corresponds to the MAC layer deleting the time alignment timer based on an indication from a Radio Resource Control (RRC).

13. The method of claim 9, wherein the MAC layer timing control is a Timing Advance Command (TAC) MAC Control Element (CE), and wherein an identifier associated with the PUR transmission is a PUR-Radio Network Temporary Identifier (RNTI), and wherein a resource configuration response window timer is a PUR respond window timer.

14. A method of wireless communication, comprising:
transmitting, by network node to a wireless device, a Radio Resource Control (RRC) connection setup message comprising a medium access control (MAC) layer timing control,
wherein the message is configured to cause the wireless device to: start, based on a rule, a time alignment timer, wherein the rule specifies that the time alignment timer is not started when a MAC layer is performing a PUR transmission and that the time alignment timer is started when the MAC layer is not performing the PUR transmission;
wherein the MAC layer timing control is multiplexed with the RRC connection setup message to generate a MAC protocol data unit (PDU).

15. The method of claim 14, wherein performing the PUR transmission corresponds to one of the MAC layer comprising an identifier associated with the PUR transmission or a resource configuration response window timer being inactive.

16. The method of claim 14, wherein not performing the PUR transmission corresponds to receiving a Timing Advance Command MAC control element indicated by a Physical Downlink Control Channel (PDCCH) addressed to a Cell-Radio Network Temporary Identifier (C-RNTI).

17. The method of claim 14, wherein performing the PUR transmission corresponds to the MAC layer deleting the time alignment timer based on an indication from a Radio Resource Control (RRC).

18. The method of claim 14, wherein the MAC layer timing control is a Timing Advance Command (TAC) MAC Control Element (CE), and wherein an identifier associated with the PUR transmission is a PUR-Radio Network Temporary Identifier (RNTI), and wherein a resource configuration response window timer is a PUR respond window timer.

19. The method of claim 9, wherein the medium access control (MAC) layer timing control is multiplexed with the RRC connection setup message to generate a MAC protocol data unit (PDU).

20. The method of claim 14, wherein the medium access control (MAC) layer timing control is multiplexed with the RRC connection setup message to generate a MAC protocol data unit (PDU).

21. A wireless device comprising:
at least one processor configured to cause the wireless device to implement a method of wireless communication, comprising:
transmitting, by the wireless device, a Radio Resource Control (RRC) connection resume request to a network node;
receiving, by the wireless device from the network node, an RRC connection setup message;

configuring, based on the RRC connection setup message, the wireless device to establish an RRC connection with the network node using a Preconfigured Uplink Resource (PUR); and starting a time alignment timer based on the RRC connection setup message, wherein a medium access control (MAC) layer timing control is multiplexed with the RRC connection setup message to generate a MAC protocol data unit (PDU).

22. A wireless device comprising:

at least one processor configured to cause the wireless device to implement a method of wireless communication, comprising:

transmitting, by the wireless device, a Radio Resource Control (RRC) connection resume request to a network node;

receiving, by a wireless device from the network node, an RRC connection setup message comprising a medium access control (MAC) layer timing control;

configuring, based on the RRC connection setup message, the wireless device to establish an RRC connection with the network node using a Preconfigured Uplink Resource (PUR); and starting, based on a rule, a time alignment timer, wherein the rule specifies that the time alignment timer is not started when a MAC layer is performing a PUR transmission and that the time alignment timer is started when the MAC layer is not performing the PUR transmission;

wherein the MAC layer timing control is multiplexed with the RRC connection setup message to generate a MAC protocol data unit (PDU).

* * * * *